(12) United States Patent
Chen

(10) Patent No.: US 11,714,608 B2
(45) Date of Patent: Aug. 1, 2023

(54) DEVICE AND METHOD FOR HANDLING PROGRAMMING LANGUAGE FUNCTION

(71) Applicant: Realtek Semiconductor Corp., HsinChu (TW)

(72) Inventor: Yuefeng Chen, Suzhou (CN)

(73) Assignee: Realtek Semiconductor Corp., HsinChu (TW)

(*) Notice: Subject to any disclaimer, the term of this patent is extended or adjusted under 35 U.S.C. 154(b) by 7 days.

(21) Appl. No.: 17/572,558

(22) Filed: Jan. 10, 2022

(65) Prior Publication Data
US 2022/0365757 A1 Nov. 17, 2022

(30) Foreign Application Priority Data
May 14, 2021 (CN) .......................... 202110528812.3

(51) Int. Cl.
*G06F 8/30* (2018.01)
(52) U.S. Cl.
CPC .................................... *G06F 8/311* (2013.01)
(58) Field of Classification Search
CPC ...................................................... G06F 8/311
See application file for complete search history.

(56) References Cited

U.S. PATENT DOCUMENTS

| | | | |
|---|---|---|---|
| 5,870,625 A * | 2/1999 | Chan ..................... | G06F 9/3824 712/E9.046 |
| 2006/0190647 A1* | 8/2006 | Asano ................. | G06F 13/4221 710/110 |
| 2006/0236008 A1* | 10/2006 | Asano ..................... | G06F 13/42 710/110 |
| 2013/0332662 A1* | 12/2013 | Katori ................... | G06F 3/0679 711/105 |
| 2017/0220296 A1* | 8/2017 | Kim ........................ | G06F 3/065 |
| 2017/0293556 A1* | 10/2017 | Rozario .............. | G06F 12/0842 |
| 2018/0357175 A1* | 12/2018 | Jiang ................... | G06F 12/0802 |
| 2022/0083273 A1* | 3/2022 | Saito ..................... | G06F 3/0604 |

\* cited by examiner

*Primary Examiner* — Phillip H Nguyen
(74) *Attorney, Agent, or Firm* — Winston Hsu

(57) ABSTRACT

A processing device used in a bus, for executing a programming language function of a central processing unit (CPU), comprises a receiving circuit, for receiving a joint command from the CPU, to assist the CPU to execute the programming language function, wherein the joint command comprises an extended read command and an extended write command; a transmitting circuit, coupled to the receiving circuit, for transmitting the extended read command to a slave device, to receive a first response message via the receiving circuit in response to the extended read command from the slave device, wherein the first response message comprises at least one data read by the slave device from a memory block; and a writing circuit, coupled to the receiving circuit and transmitting circuit, for writing the at least one data into a destination address corresponding to the programming language function according to the extended write command.

10 Claims, 5 Drawing Sheets

DEVICE AND METHOD FOR HANDLING PROGRAMMING LANGUAGE FUNCTION

BACKGROUND OF THE INVENTION

1. Field of the Invention

The present invention relates to a device and a method, and more particularly, to a device and a method of executing a programming language function of a central processing unit.

2. Description of the Prior Art

In a computer system, a central processing unit (CPU) executes multiple types of programming languages. According to the prior art, when the CPU executes "copy" or "move" on the data of a programming language (e.g., memcpy or strcpy of the C language), the CPU needs to write data into (or read data from) a memory block repeatedly and that consumes the CPU with a long processing time. In addition, when the programming language is processed via a direct memory access controller (DMAC), it requires more programming codes being executed, more complicated execution processes and more resources for the execution. Thus, to improve an execution speed and an execution efficiency of the CPU has become an important problem to be solved.

SUMMARY OF THE INVENTION

The present invention therefore provides a processing device and a method for executing a programming language function of a CPU to solve the abovementioned problem.

A processing device used in a bus, for executing a programming language function of a central processing unit (CPU), comprises: a receiving circuit configured to receive a joint command from the CPU, to assist the CPU to execute the programming language function, wherein the joint command comprises an extended read command and an extended write command; a transmitting circuit, coupled to the receiving circuit, being configured to transmit the extended read command to a slave device, to receive a first response message via the receiving circuit in response to the extended read command from the slave device, wherein the first response message comprises at least one data read by the slave device from a memory block; and a writing circuit, coupled to the receiving circuit and transmitting circuit, being configured to write the at least one data into a destination address corresponding to the programming language function according to the extended write command.

A processing device used in a memory control device, for executing a programming language function of a central processing unit (CPU), comprises a transmitting circuit; a receiving circuit, coupled to the transmitting circuit, being configured to receive a joint command from a bus, to assist the CPU to execute the programming language function, wherein the joint command comprises an extended read command and an extended write command; a reading circuit, coupled to the receiving circuit, being configured to read at least one data from a memory block according to the extended read command; and a writing circuit, coupled to the transmitting circuit and the reading circuit, being configured to write the at least one data into a destination address corresponding to the programming language function according to the extended write command.

A method for handling a programming language for a processing device, for executing a programming language function of a central processing unit (CPU), comprises receiving a joint command from the CPU, to assist the CPU to execute the programming language function, wherein the joint command comprises an extended read command and an extended write command; transmitting the extended read command to a slave device after receiving the joint command, to receive a response message in response to the extended read command from the slave device, wherein the response message comprises at least one data read by the slave device from a memory block; and writing the at least one data into a destination address corresponding to the programming language function according to the extended write command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
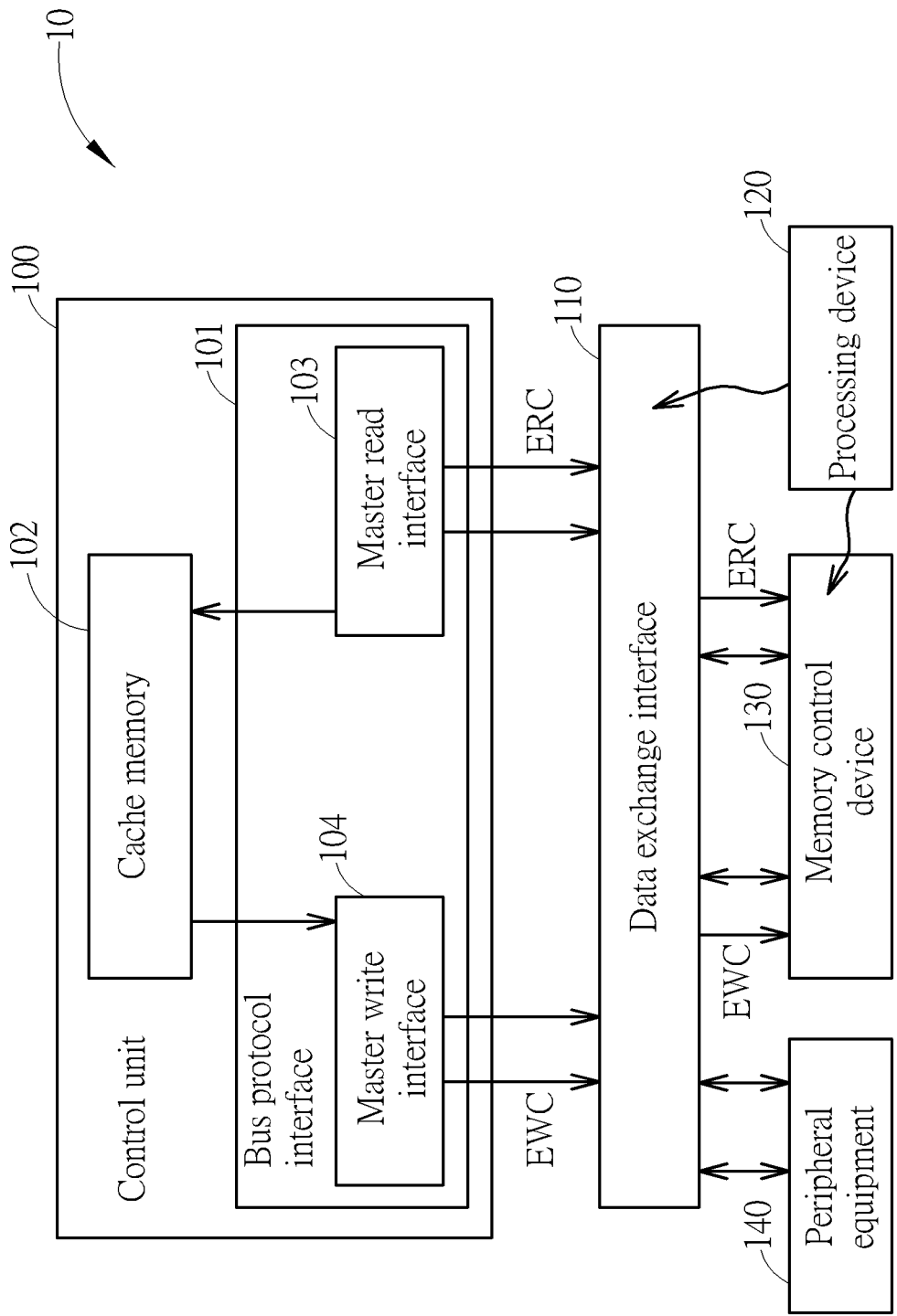
FIG. 1 is a schematic diagram of a processing system according to an example of the present invention.

FIG. 1 is a schematic diagram of a processing system 10 according to an example of the present invention. The processing system 10 comprises a control unit 100, a data exchange interface 110, a processing device 120, a memory control device 130 and a peripheral equipment 140. The control unit 100 may be a central processing unit (CPU), a master control unit (MCU) or a digital signal processor (DSP), and is not limited herein. The data exchange interface 110 may be a bus or an interconnect interface, and is not limited herein. The control unit 100 comprises a bus protocol interface 101 and a cache memory 102, wherein the bus protocol interface 101 comprises a master read interface 103 and a master write interface 104. The memory control device 130 may be a slave device of the data exchange interface 110. The processing device 120 may be installed in the data exchange interface 110 or the memory control device 130, to assist the control unit 100 to execute a programming language function of the control unit 100. The data exchange interface 110 may connect with multiple peripheral equipment 140 simultaneously. In detail, the control unit 100 transmits a joint command of the programming language function to the data exchange interface 110 according to at least one extended command, wherein the joint command comprises an extended read command ERC and an extended write command EWC. The extended read command ERC and the extended write command EWC are transmitted to the data exchange interface 110 via the master read interface 103 and the master write interface 104, respectively. That is, the joint command may be transmitted via multiple interfaces.

The processing system 10 may perform a different operation, if the processing device 120 is installed in a different device. The processing device 120 may receive the joint command, to assist the control unit 100 to execute the programming language function, if the processing device 120 is installed in the data exchange interface 110. After receiving the joint command, the processing device 120 transmits the extended read command ERC to the memory control device 130, to receive at least one data from the memory control device 130, wherein the memory control device 130 reads a memory block (not shown in the figure) to obtain the at least one data. The processing device 120 writes the at least one data into a destination address corresponding to the programming language function according to the extended write command EWC. On the other hand, if the processing device 120 is installed in the memory control device 130, the data exchange interface 110 transmits the joint command to the processing device 120 after receiving the joint command, for the processing device 120 to assist the control unit 100 to execute the programming language function. After receiving the joint command, the processing device 120 reads at least one data from a memory block. Then, the processing device 120 writes the at least one data into the destination address corresponding to the programming language function according to the extended write command EWC.

Figure 2:
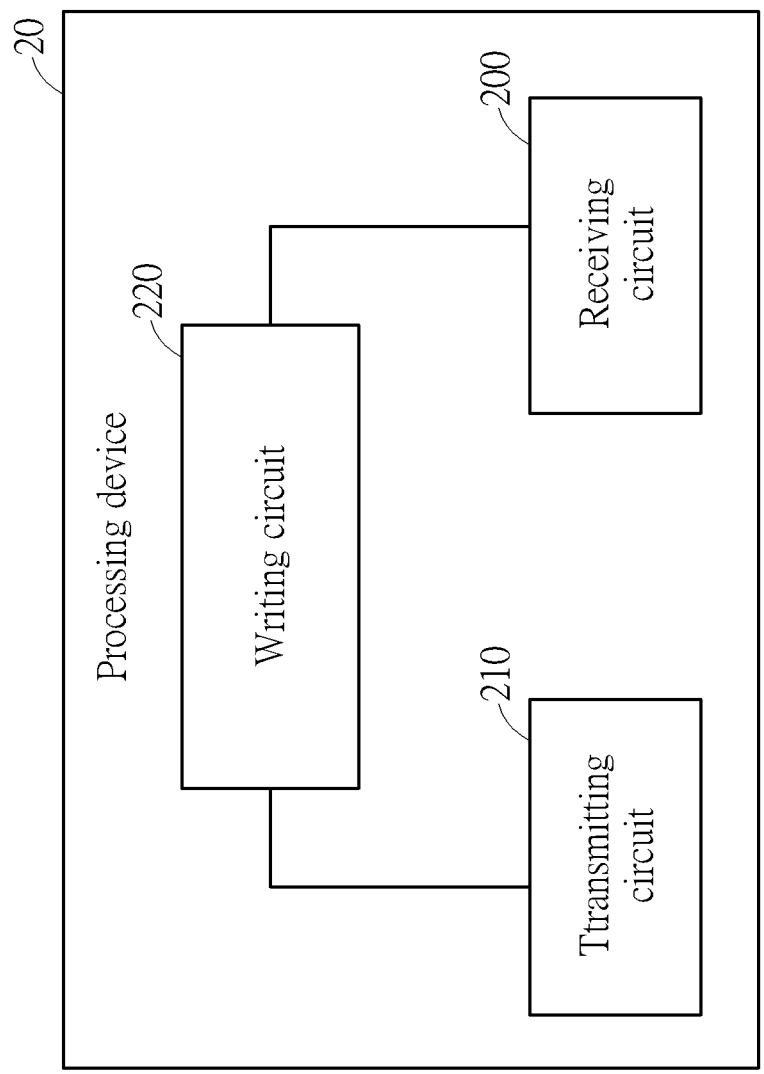
FIG. 2 is a schematic diagram of a processing device according to an example of the present invention.

FIG. 2 is a schematic diagram of a processing device 20 according to an example of the present invention. The processing device 20 may be installed in the data exchange interface 110 (e.g., bus), for executing a programming language function of the control unit 100 (e.g., CPU). The processing device 20 may be used for realizing the processing device 120 in FIG. 1. The processing device 20 comprises a receiving circuit 200, a transmitting circuit 210 and a writing circuit 220. In detail, the receiving circuit 200 receives a joint command from the control unit 100, to assist the control unit 100 to execute the programming language function, wherein the joint command comprises an extended read command ERC and an extended write command EWC. The transmitting circuit 210 is coupled to the receiving circuit 200, and transmits the extended read command ERC to a slave device (e.g., the memory control device 130 in FIG. 1) after the receiving circuit 200 receives the joint command, to receive a first response message in response to the extended read command ERC from the slave device via the receiving circuit 200. The first response message comprises at least one data read by the slave device from a memory block. The writing circuit 220 is coupled to the receiving circuit 200 and the transmitting circuit 210, and writes the at least one data into a destination address corresponding to the programming language function according to the extended write command EWC, after the receiving circuit 200 receives the first response message.

According to the above description, the present invention provides a processing device for assisting a CPU to execute a programming language function. An execution speed of the programming language function is improved, and a processing time of the CPU is reduced. Thus, problems of the execution speed and the processing time are solved.

In one example, the slave device is a memory control device (e.g., the memory control device 130 in FIG. 1). In one example, the programming language function is a C language function. In one example, the programming language function is memcpy, strcpy, strcat, strdup, strncat or memmove, and is not limited herein. In one example, the control unit 100 (e.g., CPU) is a Microprocessor without Interlocked Pipeline Stages (MIPS) structure, an advanced reduced instruction set computer (RISC) machine (ARM) structure or a RISC-V structure, and is not limited herein. In one example, the control unit 100 comprises at least one extended command. In one example, the at least one extended command is a command of the RISC-V structure. In one example, an extended command in the present invention may be the following RISC-V command:

MEMCPY rd, rs1, rs2, imm rd is a destination address of a programming language function memory copy. rs1 is a source address of the programming language function memory copy. rs2 is a number of the programming language function memory copy. imm is a data width, and a length of the data length is 7 bits. For example, the data width is 1 byte, if imm is 0 (i.e., default). The data width is 2 bytes, if imm is 1. The data width is 4 bytes, if imm is 2. The data width is 8 bytes, if imm is 8. The data width is 16 bytes, if imm is 9. Variations of imm and the data width are not limited to the above examples. In one example, the RISC-V command further comprises option bit(s) for representing whether to write the at least one data to the cache memory 102 of the control unit 100, and a length of the option bit (s) may be 3 bits. In one example, it means writing the at least one data to the cache memory 102 of the control unit 100, if the option bit is 1. It means not writing the at least one data to the cache memory 102 of the control unit 100, if the option bit is 0.

In one example, the at least one extended command further comprises an operation code (OP code) of 0x3f. In one example, the at least one extended command has the following command format: rd with a length of 5 bits, rs1 with a length of 5 bits, rs2 with a length of 5 bits, imm with a length of 7 bits, an option bit with a length of 3 bits and an OP code with a length of 7 bits.

In one example, the joint command is a bus command generated according to the at least one extended command executed by the control unit 100. That is, the control unit 100 converts information in the at least one extended command to the bus command and marks the bus command as the joint command, to represent that the bus command is a command operated jointly by the extended read command ERC and the extended write command EWC, when the control unit 100 executes the at least one extended command. In one example, the control unit 100 transmits the joint command to the receiving circuit 200 via at least one extended signal. That is, the control unit 100 transmits processing information of the programming language function to the processing device 20 via the at least one extended signal, for the processing device 20 to execute operations originally scheduled to be executed by the control unit 100. In one example, the at least one extended signal comprises an extended read signal and an extended write signal. In one example, the control unit 100 transmits the extended read command ERC and the extended write command EWC to the receiving circuit 200 via the extended read signal and the extended write signal, respectively. That is, the extended read signal and the extended write signal in the joint command may be transmitted to the processing device 20 via different extended signals. In one example, the control unit 100 transmits the extended read command ERC comprising araddr, arlen, arsize and arvalid to the receiving circuit 200, if a bus protocol is an advanced extensible interface (AXI) bus protocol. Functions of araddr and rs1 are the same, and represent a source address. Functions of arlen and rs2 are the same, and represent a burst length, which means a data length or a data quantity of the at least one data. Functions of arsize and imm are the same, and represent a data width or a data size of the at least one data. arvalid is a significant bit, and "arvalid=1" represents starting executing the extended read command ERC. In one example, the control unit 100 transmits the extended write command EWC comprising awaddr, awlen, awsize and awvalid to the receiving circuit 200, if the bus protocol is the AXI bus protocol. Functions of awaddr and rs1 are the same, and represent the source address. Functions of awlen and rs2 are the same, and represent the burst length, which means the data length or the data quantity of the at least one data. Functions of awsize and imm are the same, and represent the data width or the data size of the at least one data. awvalid is a significant bit, and "awvalid=1" represents starting executing the extended write command EWC.

In one example, the at least one extended signal used by the control unit 100 is an AXI user extended signal. In one example, the extended read signal used by the control unit 100 for transmitting the extended read command ERC is aruser[0]=1, which represents that the extended read command ERC is a command operated jointly with an AXI write channel. In one example, the extended read signal used by the control unit 100 for transmitting the extended write command EWC is awuser[0]=1, which represents that the extended write command EWC is a command operated jointly with an AXI read channel. In one example, the extended read signal and the extended write signal comprise a flag, for indicating a destination address of the programming language function.

In one example, if the data length of the joint command is greater than a maximum value of the burst length, a compiler of the control unit 100 may divide the joint command into multiple parts, to transmit the joint command in multiple transmissions. In one example, if the data length of the joint command is greater than the maximum value of the burst length, a bit width of arlen of the bus is extended, to increase the data length that can be transmitted by the control unit 100 in a single transmission. In one example, if the data length of the joint command is greater than the maximum value of the burst length, the control unit 100 transmits the joint command to the bus via an extended signal (e.g., AXI user extended signal). In one example, when to transmit the joint command is determined according to a pipeline of the control unit 100 or an internal structure of the control unit 100. In one example, the control unit 100 transmits the joint command to the receiving circuit 200, when the bus is in an idle state and the control unit 100 is in a state capable of transmitting an outstanding command.

In one example, after receiving the joint command, the processing device 20 stores the data length, and the transmitting circuit 210 transmits the extended read command ERC to the slave device.

In one example, the control unit 100 further transmits a read command to the receiving circuit 200. The transmitting circuit 210 transmits the at least one data to the control unit 100 according to the read command. That is, if the at least one data is requested to be transmitted to the control unit 100, the control unit 100 further transmits the read command (e.g., regular read command) different from the extended read command ERC to the processing device 20, to receive the at least one data from the processing device 20. In this case, the control unit 100 may use the at least one data immediately.

In one example, after the receiving circuit 200 receives the joint command, the transmitting circuit 210 transmits a second response message to the control unit 100. In one example, after the writing circuit 220 writes the at least one data into the destination address corresponding to the programming language function, the transmitting circuit 210 transmits a second response message to the control unit 100. In one example, the transmitting circuit 210 transmits a second response message to the control unit 100 through an interrupt signal.

In one example, if the data length of the at least one data is greater than a maximum value of the burst length, the processing device 20 may divide the at least one data into multiple parts, to perform multiple transmissions and may store a source address, a destination address and a data quantity of the at least one data, to facilitate multiple transmissions until the at least one data is transmitted completely.

In one example, the control unit 100 (e.g., CPU) transmits one of the extended read command ERC or the extended write command EWC to the receiving circuit 200. That is, the control unit 100 may use one extended command for transmitting data related to performing the programming language function to the receiving circuit 200. In one example, if the control unit 100 selects the extended read command ERC for transmitting a command, the control unit 100 transmits a command of the programming language function to the receiving circuit 200 via an extended read signal of a master read interface of the control unit 100. In one example, if the bus protocol is an AXI bus protocol and the control unit 100 selects the extended read command ERC for transmitting a command, the control unit 100 transmits data of the destination address of the programming language function to the receiving circuit 200 via an aruser extended signal. In one example, if the control unit 100 selects the extended write command EWC for transmitting a command, the control unit 100 transmits the command of the programming language function to the receiving circuit 200 via an extended write signal of a master write interface of the control unit 100. In one example, if the bus protocol is the AXI bus protocol and the control unit 100 selects the extended write command EWC for transmitting a command, the control unit 100 transmits data of the source address of the programming language function to the receiving circuit 200 via a write data channel (e.g., wdata channel).

It is noted that the above examples related to the control unit 100 (e.g., CPU) may be realized via a MCU or a DSP, and is not limited herein.

Figure 3:
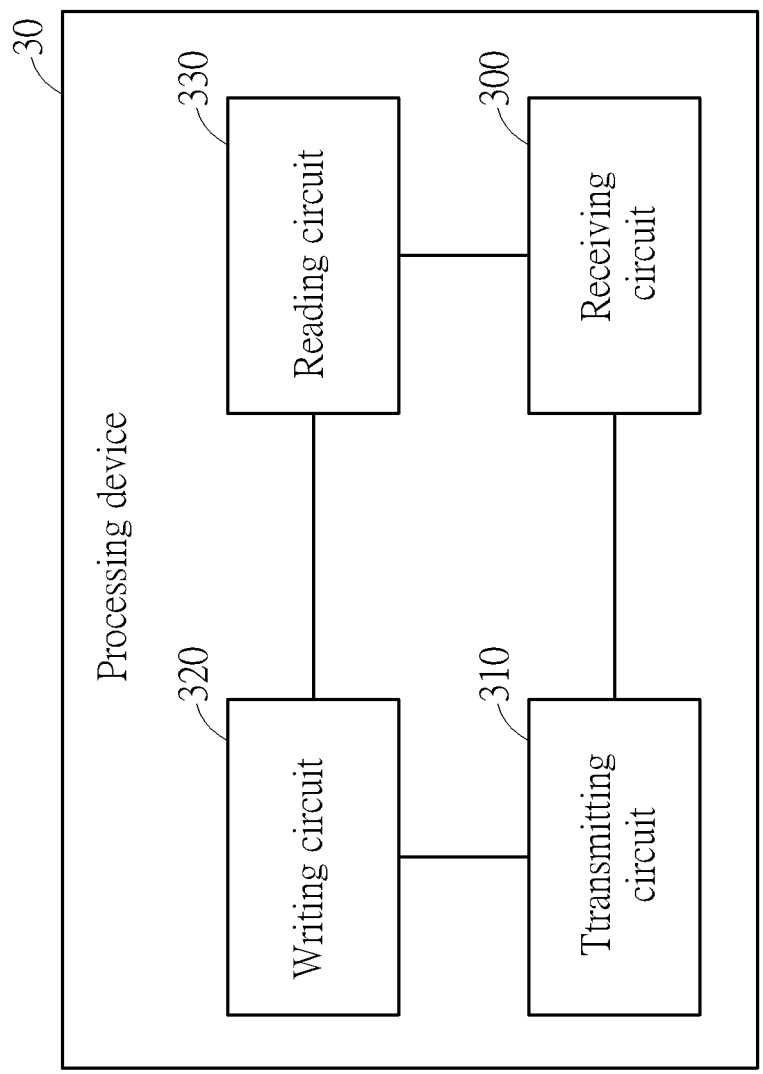
FIG. 3 is a schematic diagram of a processing device according to an example of the present invention.

FIG. 3 is a schematic diagram of a processing device 30 according to an example of the present invention. The processing device 30 may be installed in the memory control device 130, for executing a programming language function of the control unit 100 (e.g., CPU). The processing device 30 may be used for realizing the processing device 120 in FIG. 1. The processing device 30 comprises a receiving circuit 300, a transmitting circuit 310, a writing circuit 320 and a reading circuit 330. In detail, the receiving circuit 300 is coupled to the transmitting circuit 310, and receives a joint command from a bus, to assist the control unit 100 to execute the programming language function, wherein the joint command comprises an extended read command ERC and an extended write command EWC. The reading circuit 330 is coupled to the receiving circuit 300, and reads at least one data from a memory block according to the extended read command ERC. The writing circuit 320 is coupled to the receiving circuit 300 and the transmitting circuit 310, and writes the at least one data into a destination address of the programming language function according to the extended write command EWC.

According to the previous description, after receiving the extended read signal and the extended write signal, the processing device 30 reads the at least one data from a memory block of a source address, and writes the at least one data into the destination address. In other words, if the source address and the destination address are in a same device, the processing device 30 can directly perform "copy" or "move" on the at least one data without transmitting the extended read command ERC to another device (e.g., a slave device or a memory control device) and waiting for a response from the other device.

According to the previous description, the present invention provides a processing device (e.g., the processing device 20 or the processing device 30) for assisting the control unit 100 to perform a programming language function. An execution speed of the programming language function is improved, and a processing time of the control unit 100 is reduced. Thus, problems of the execution speed and the processing time are solved.

In one example, the joint command is a bus command generated according to the at least one extended command executed by the control unit 100 (e.g., CPU). That is, the control unit 100 converts information in the at least one extended command to the bus command and marks the bus command as the joint command, to represent that the bus command is a command operated jointly by the extended read command ERC and the extended write command EWC, when the control unit 100 executes the at least one extended command. In one example, the bus transmits the joint command to the receiving circuit 300 via at least one extended signal. That is, the bus transmits processing information of the programming language function to the processing device 30 via the at least one extended signal, for the processing device 30 to execute operations originally scheduled to be executed by the control unit 100. In one example, the at least one extended signal comprises an extended read signal and an extended write signal. In one example, the bus transmits the extended read command ERC and the extended write command EWC to the receiving circuit 300 via the extended read signal and the extended write signal, respectively. That is, the extended read signal and the extended write signal in the joint command may be transmitted to the processing device 30 via different extended signals.

In one example, the control unit 100 transmits the extended read command ERC comprising araddr, arlen, arsize and arvalid to the bus, if the bus protocol is an AXI bus protocol. Then, the bus transmits the extended read command ERC to the receiving circuit 300. araddr represents a source address. arlen is a burst length, which means a data length or a data quantity of the at least one data. arsize represents a data width or a data size of the at least one data. arvalid is a significant bit, and "arvalid=1" represents starting executing the extended read command ERC. In one example, the control unit 100 transmits the extended write command EWC comprising awaddr, awlen, awsize and awvalid to the bus, if the bus protocol is the AXI bus protocol. Then, the bus transmits the extended write command EWC to the receiving circuit 300. awaddr represents a source address. awlen is a burst length, which means a data length or a data quantity of the at least one data. awsize represents a data width or a data size of the at least one data. awvalid is a significant bit, and "awvalid=1" represents starting executing the extended read command EWC.

In one example, after the receiving circuit 300 receives the joint command, the transmitting circuit 310 transmits a second response message to the bus, to transmit the second response message to the control unit 100 (e.g., CPU) via the bus. In one example, after the writing circuit 320 writes the at least one data into the destination address corresponding to the programming language function, the transmitting circuit 310 transmits a second response message to the bus, to transmit the second response message to the control unit 100 via the bus. In one example, the transmitting circuit 310 transmits a second response message to the bus through an interrupt signal, to transmit the second response message to the control unit 100 via the bus.

In one example, the bus transmits one of the extended read command ERC or the extended write command EWC to the receiving circuit 300. That is, the control unit 100 may use one extended command for transmitting data related to performing the programming language function to the bus, and the bus may transmit the extended command to the receiving circuit 300. In one example, the control unit 100 selects the extended read command ERC for transmitting a command. The control unit 100 transmits the command of the programming language function to the bus via an extended read signal of a master read interface of the control unit 100, and the bus transmits the command to the receiving circuit 300 via the extended read signal. In one example, the control unit 100 transmits data of a destination address of the programming language function to the bus via an aruser extended signal and the bus transmits the data to the receiving circuit 300 via the aruser extended signal, if the bus protocol is the AXI bus protocol and the control unit 100 selects the extended read command ERC for transmitting the command. In one example, the control unit 100 transmits a command of the programming language function to the bus via an extended write signal of a master write interface of the control unit 100 and the bus transmits the command to the receiving circuit 300 via the extended write signal, if the control unit 100 selects the extended write command EWC for transmitting the command. In one example, the control unit 100 transmits data of a source address corresponding to the programming language function to the bus via a write data channel (e.g., wdata channel) and the bus transmits the data to the receiving circuit 300 via the write data channel, if the bus protocol is the AXI bus protocol and the control unit 100 selects the extended write command EWC for transmitting the command.

The examples for the processing device 20 may be applied to the processing device 30, and is not narrated herein.

Figure 4:
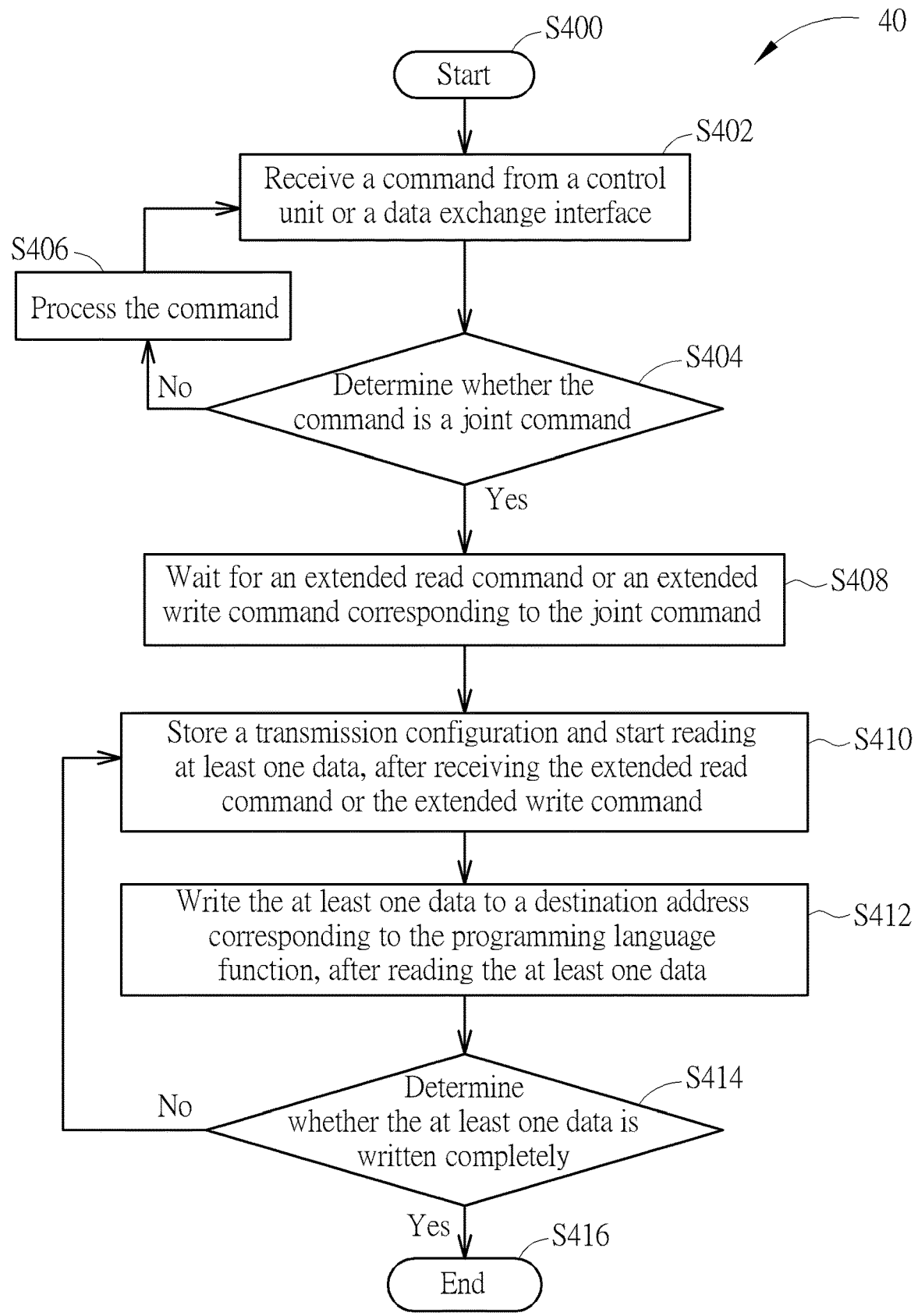
FIG. 4 is a flowchart of a process according to an example of the present invention.

Operations of the processing device 120 assisting the control unit 100 to execute a programming language function can be summarized into a process 40 shown in FIG. 4, and include the following steps:

Step S400: Start of the flow.

Step S402: A command is received from a control unit or a data exchange interface.

Step S404: Whether the command is a joint command is determined.

Step S406: If the command is not the joint command, the command is processed. After the command is processed, Step S402 is performed.

Step S408: If the command is the joint command, a receipt of an extended read command or an extended write command corresponding to the joint command is expected.

Step S410: After the extended read command or the extended write command is received, a transmission configuration is stored and reading of at least one data is started.

Step S412: After the at least one data is read, the at least one data is written into a destination address corresponding to the programming language function.

Step S414: Whether the at least one data is written completely is determined. If the at least one data fails to be written completely, Step S410 is performed.

Step S416: End of the flow.

Details and variations of the process 40 can be referred to the previous description, and are not narrated herein.

Figure 5:
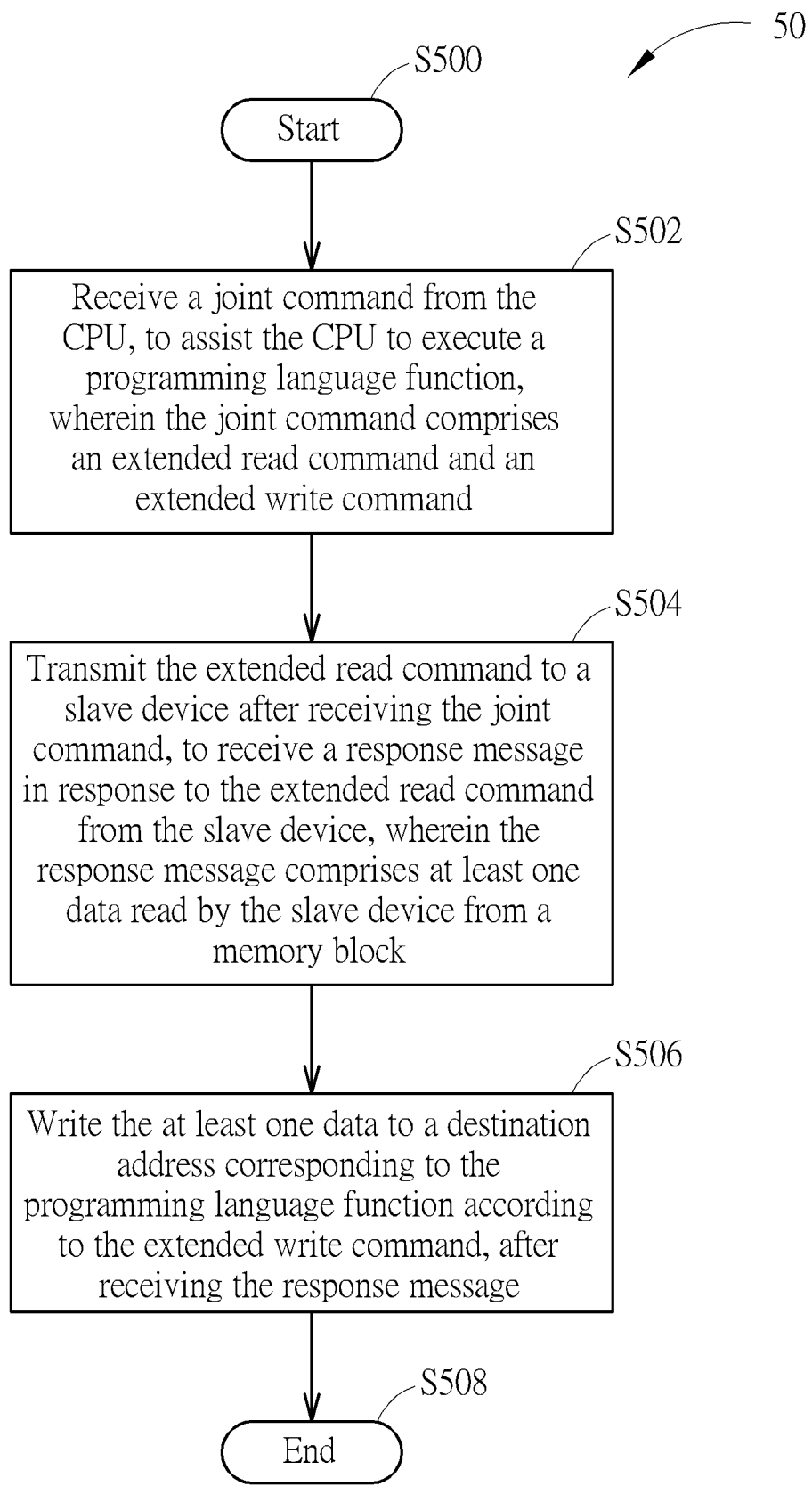
FIG. 5 is a flowchart of a process according to an example of the present invention.

Operations of the processing device 20 can be summarized into a process 50 shown in FIG. 5, and include the following steps:

Step S500: Start of the flow.

Step S502: A joint command is received from the CPU, to assist the CPU to execute a programming language function, wherein the joint command comprises an extended read command and an extended write command.

Step S504: The extended read command is transmitted to a slave device after the joint command is received, then a response message in response to the extended read command from the slave device is received, wherein the response message comprises at least one data read by the slave device from a memory block.

Step S506: After the response message is received, the at least one data is written into a destination address corresponding to the programming language function according to the extended write command.

Step S508: End of the flow.

Details and variations of the process 50 can be referred to the previous description, and are not narrated herein.

To sum up, the present invention provides a processing device for assisting the control unit 100 (e.g., CPU) to execute a programming language function. An execution speed of the programming language function is improved, and a processing time of the control unit 100 is reduced. Thus, problems of the execution speed and the processing time are solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing device used in a bus, for executing a programming language function of a central processing unit (CPU), comprising:
    a receiving circuit configured to receive a joint command from the CPU, to assist the CPU to execute the programming language function, wherein the joint command comprises an extended read command and an extended write command;
    a transmitting circuit, coupled to the receiving circuit, being configured to transmit the extended read command to a slave device, to receive a first response message via the receiving circuit in response to the extended read command from the slave device, wherein the first response message comprises at least one data read by the slave device from a memory block; and
    a writing circuit, coupled to the receiving circuit and transmitting circuit, being configured to write the at least one data into a destination address corresponding to the programming language function according to the extended write command.

2. The processing device of claim 1, wherein the joint command is a bus command generated according to at least one extended command executed by the CPU.

3. The processing device of claim 1, wherein the CPU transmits the joint command to the receiving circuit via at least one extended signal.

4. The processing device of claim 1, wherein the CPU further transmits a reading command to the receiving circuit.

5. The processing device of claim 4, wherein the transmitting circuit transmits the at least one data to the CPU according to reading command.

6. The processing device of claim 1, wherein after the receiving circuit receives the joint command, after the writing circuit writes the at least one data into the destination address corresponding to the programming language function, or through an interrupt signal, the transmitting circuit transmits a second response message to the CPU.

7. A processing device used in a memory control device, for executing a programming language function of a central processing unit (CPU), comprising:
    a transmitting circuit;
    a receiving circuit, coupled to the transmitting circuit, being configured to receive a joint command from a bus, to assist the CPU to execute the programming language function, wherein the joint command comprises an extended read command and an extended write command;
    a reading circuit, coupled to the receiving circuit, being configured to read at least one data from a memory block according to the extended read command; and
    a writing circuit, coupled to the transmitting circuit and the reading circuit, being configured to write the at least one data into a destination address corresponding to the programming language function according to the extended write command.

8. The processing device of claim 7, wherein the bus transmits the joint command to the receiving circuit via at least one extended signal.

9. The processing device of claim 7, wherein after the receiving circuit receives the joint command, after the writing circuit writes the at least one data into the destination address corresponding to the programming language function, or through an interrupt signal, the transmitting circuit transmits a response message to the bus, to transmit the response message to the CPU via the bus.

10. A method for handling a programming language for a processing device, for executing a programming language function of a central processing unit (CPU), comprising:
    receiving a joint command from the CPU, to assist the CPU to execute the programming language function, wherein the joint command comprises an extended read command and an extended write command;
    transmitting the extended read command to a slave device after receiving the joint command, to receive a response message in response to the extended read command from the slave device, wherein the response message comprises at least one data read by the slave device from a memory block; and
    writing the at least one data into a destination address corresponding to the programming language function according to the extended write command.

* * * * *